June 11, 1968  J. P. PEARSE  3,387,316
WINDSHIELD WIPER

Filed Dec. 3, 1964  2 Sheets-Sheet 1

INVENTOR.
JOHN P. PEARSE
BY
Fraser & Fraser
ATTORNEYS

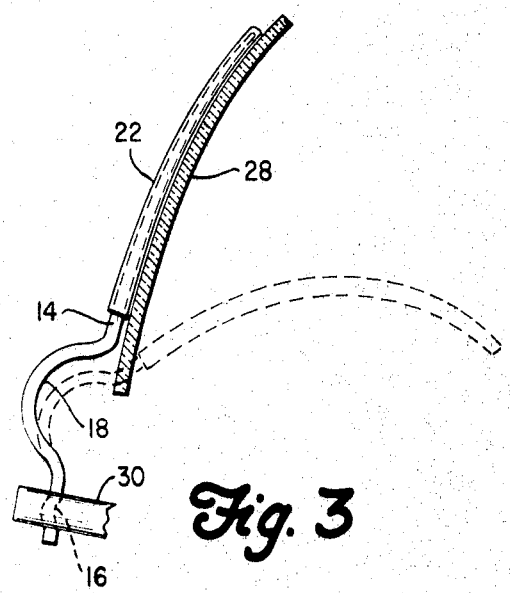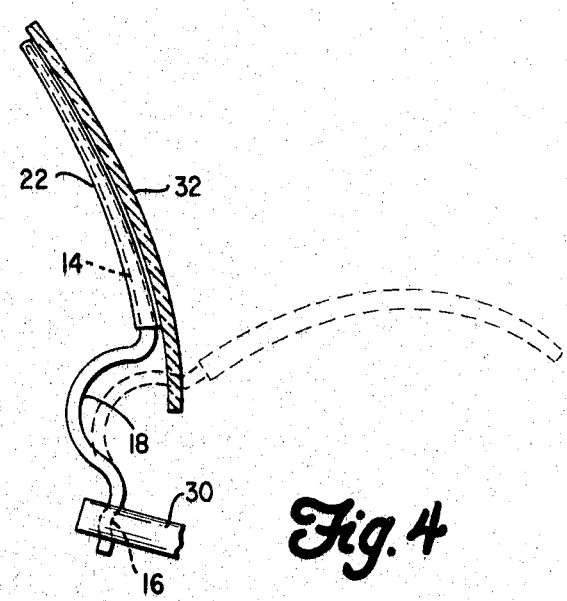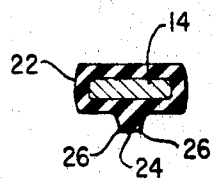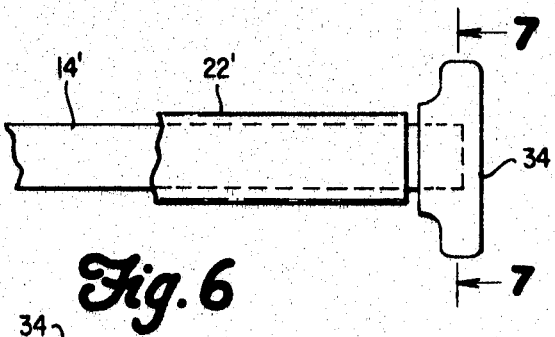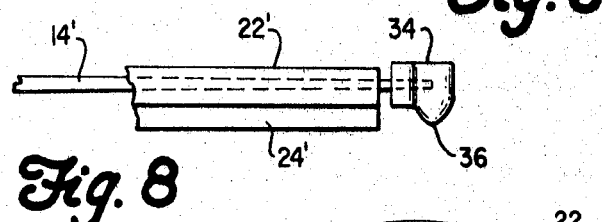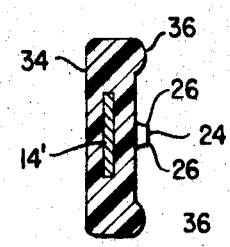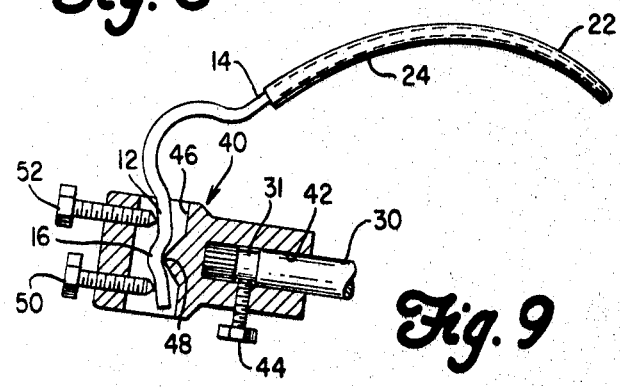

United States Patent Office 3,387,316
Patented June 11, 1968

3,387,316
WINDSHIELD WIPER
John P. Pearse, Halcyon Farm, R.F.D. 1, Box 231,
Swanton, Ohio 43558
Filed Dec. 3, 1964, Ser. No. 415,611
3 Claims. (Cl. 15—250.36)

This invention relates generally to windshield wipers and more specifically to a windshield wiper device capable of wiping a curved surface such as for example, an automobile windshield.

It is a primary object of the invention to produce a windshield wiper device adapted to apply a substantially constant wiping pressure to all increments of the wiping area at any one given portion of its duty cycle.

Another object of the invention is to produce a windshield wiping device wherein a single curved spring-like element is employed to impart an equally distributed wiping pressure to the windshield at any given time.

Still another object of the invention is to produce a windshield wiper device employing a single curved elongate spring element which may be generally rectangular in cross-section having a windshield contacting means secured to a flat surface of the element which surface is at all times substantially parallel to the surface of the windshield being wiped.

It is a further object of the invention to produce a windshield wiper device which may be readily and economically manufactured.

The above and other objects of the invention may typically be achieved by a windshield wiper device comprising an elongate continuous element formed of spring-like material, a major length of said element including the free end thereof curved to impart substantially constant pressure throughout the length thereof to the surface of the windshield, the end of the element opposite the free end being formed for securement to a driving means, said element being flexible in a first plane toward and away from the windshield and substantially rigid in a second plane normal to said first plane, and a flexible resilient medium carried by said element and covering at least the surface of the element adjacent the windshield.

Other objects and advantages of the invention will become manifest from the following detailed description of a device incorporating the principles of the invention when considered in the light of the accompanying drawings, in which:

FIGURES 1A, 1B and 1C are cross-sectional views of the spring element illustrated in FIGURE 1 taken along lines 1A—1A, 1B—1B and 1C—1C thereof, respectively;

FIGURE 3 is a fragmentary side view of a windshield wiper device incorporating the spring element illustrated in FIGURE 2 employed in connection with a convex windshield structure;

FIGURE 4 is a fragmentary side view of a windshield wiper device incorporating the spring element illustrated in FIGURE 2 employed in connection with a concave windshield structure;

FIGURE 5 is a cross-sectional view of a windshield wiper device showing the configuration of one of the wiping edge configurations for satisfactorily wiping the surface of an associated windshield;

FIGURE 6 is a fragmentary elevational view of the free end of a windshield wiper device employing a contact member thereon to effect a torquing action of the associated spring element when the apparatus is employed in association with windshield assemblies having compound curves;

FIGURE 7 is a cross-sectional view of the device illustrated in FIGURE 6 taken along line 7—7 thereof;

FIGURE 8 is a fragmentary side view of the device illustrated in FIGURE 6; and

FIGURE 9 is a side elevational view of a mounting and pressure control mechanism for the windshield wiper element of the invention.

Figure 1:
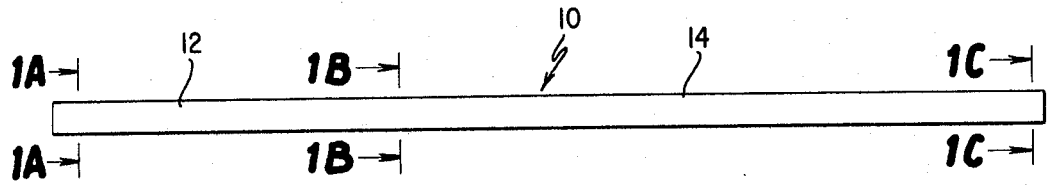
FIGURE 1 is an elevational view of the spring element of the wiper device prior to being finally formed.

Referring to the drawings, there is shown in FIGURE 1 a transducer element, generally indicated by reference numeral 10, which is formed of an elongate continuous strip of spring-like material, such as for example, spring steel. As will become more apparent from the following description, materials other than spring steel could be employed in the fabrication of the element 10, such for example as a plastic material having similar characteristics. The element 10 comprises two sections, 12 and 14, both being preferably of a fixed width. The section 12 is formed to have a constant of uniform thickness; while the section 14 is formed to have a tapering thickness. The configuration of the element 10 is illustrated in FIGURES 1A, 1B and 1C which show that the thickness of the section 12 is substantially constant from the distal end (FIGURE 1A) for a short distance to the zone in which FIGURE 1B is taken, and then the section 14 continuously tapers to the free end thereof as shown in FIGURE 1C.

Figure 2:
FIGURE 2 is a side view of the spring element illustrated in FIGURE 1 after it has been finally formed.
Figure 2:
Figure 2:
Figure 2:
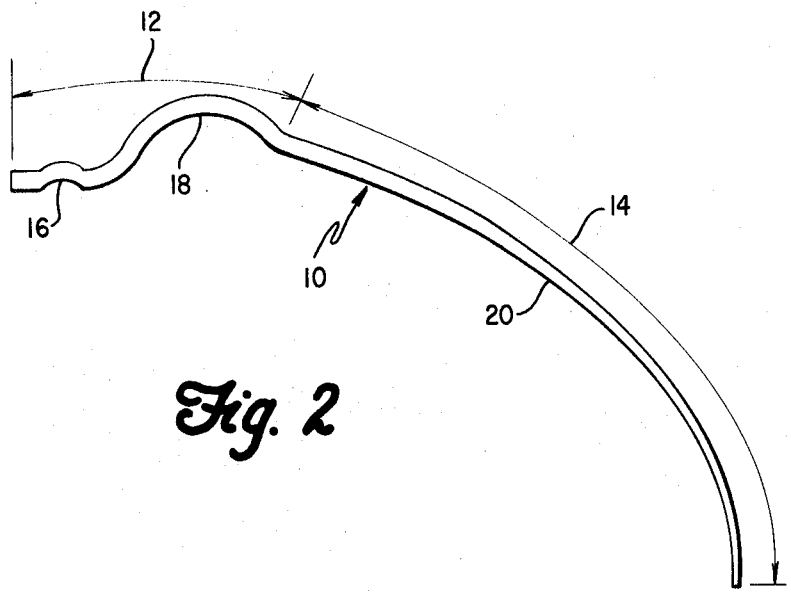

The element 10 is then formed into a shape illustrated in FIGURE 2. The section 12 of the element 10 of uniform cross-sectional area is formed to provide a notched configuration, as at 16, and a bowed section 18; while section 14 of tapering thickness is formed in the shape of an aspheric curve 20.

The next step in fabricating the windshield wiper assembly is the application of an elastomeric coating 22 on the curved tapered section 14 to produce the assembly illustrated in FIGURES 3, 4 and 5. The elastomeric coating 22 is typically formed of a synthetic rubber material, but it must be understood that other resilient elastic materials could be satisfactorily employed. The configuration of the coating 22 is such that it completely envelops the curved tapered section 14 and is further provided with a laterally extending double-edged wiping head 24. While the preferred embodiment of the apparatus utilizes a coating 22 which completely surrounds the section 14, satisfactory wiping action could be achieved by merely applying the coating 22 to the surface of the section 14 most adjacent the surface of the windshield. The wiping head 24 is provided with wiping edges 26 which are adapted to alternately engage the surface of an associated windshield structure 28. It will be readily apparent that the configuration of the wiping portion of the assembly may be constructed otherwise than is specifically illustrated.

The coating 22 may be applied to the element 10 by molding the coating 22 and the wiping head 24 thereon to provide a substantially integral assembly. Also, the coating 22 and the wiping head 24 could be molded as a unit and then fitted onto the curved section 14 of the element 10. The latter method will permit ready replacement of the coating 22 and the wiping head 24 by the user.

The windshield wiper assembly above described can be satisfactorily secured to a drive shaft 30 of an oscillating motor (not shown) by inserting a notched portion 16 of the element 10 into a suitably provided receiving aperture formed therein.

FIGURE 3 illustrates the wiper assembly installed to wipe the surface of a windshield 28 having a convex curvature. The dotted lines in FIGURE 3 illustrate the position of the wiper element assuming it had been mounted in the drive shaft 30 without the presence of the windshield 28. In such assumed condition, the windshield wiper element would be flexed to an unsprung position wherein the longitudinal axis of the curved tapered section 14 would be nearly parallel to the longitudinal axis of the drive shaft 30. However, in operative position, the wiper element 10 is placed in tension to cause the curved section 14 and the wiper head 24 to apply a wiping pressure against the adjacent surface of the windshield 28. The pressure thus applied is in a plane generally perpendicular to the plane of the tangent of the curved surface of the windshield 28.

Due to the universality of the construction, the wiper assembly may likewise be employed to satisfactorily wipe a concave surface of an automobile back light 32, for example, as illustrated in FIGURE 4. FIGURE 4, as well as FIGURE 3, diagrammatically illustrate in dotted lines, the position of the wiper assembly assuming the assembly were mounted without an associated surface to be wiped.

The structural concepts of the element 10 enable the windshield wiper assembly to be flexed in a plane generally normal to the plane of travel thereof; while militating against flexure in a plane generally parallel to the plane of travel of the wiper assembly. Clearly, this result is achieved by the structure of the element 10 which has a relatively small thickness dimension to enable flexure in one direction generally toward and away from the windshield; while the width dimension is substantial enough to prevent flexure in a plane normal to said one direction.

The bowed section 18 provides the major portion of the spring tension causing the wiping head 24 of the curved tapered section 14 to snugly engage the adjacent surface of the associated windshield. The spring tension of the curved tapered section 14 is sufficient to cause entire continuous uninterrupted undersurface thereof and the associated wiping head 24 to conform to the curvature of the surface of the windshield being wiped. It will be appreciated that as the driving motor causes the driving shaft 30 to oscillate, the element 10 and its associated wiping head 24 move in an oscillatory manner over the wiping area of the windshield, causing the element 10 and the wiping head 24 to pass over different compound curvatures. It has been found that the illustrated and described structure effects a continuous intimate wiping contact between the edges 26 of the wiping head 24 and the surface of the windshield being wiped.

An ancillary advantage of the structure described is the elimination of the reflection problem created by the conventional windshield wiper units which contain exposed highly polished or plated exterior surfaces permitting sun rays to be reflected into the eyes of the operator of the vehicle. The reflectivity of the present apparatus is substantially eliminated since the entire exposed surface of the curved tapered section 14 is typically completely enveloped by the elastomeric coating 222 which has a very low level of reflectivity.

In certain applications of extremely severe compound curved windshields, it has been found desirable to employ a slightly modified form of the structure thus far described to provide further assurance that the wiping edge of the elastomeric coating is maintained in proper relation to the surface of the windshield being wiped. FIGURES 6, 7 and 8 illustrate a modified form of the structure, wherein a contact member 34 is disposed on the free end of the curved tapered section 14'. The contact member 34 is generally rectangular in shape and extends transversely outwardly beyond the sides of the free end of the section 14'. A pair of spaced button-like extensions 36 depend downwardly from the undersurface of the contact member 34. The button-like extensions 36 do not depend or extend as far as the wiping head 24', so that in normal operation the extensions 36 do not contact the surface of the associated windshield. However, when the assembly encounters a severe compound curved portion of the surface being wiped, one or the other of the contact buttons 36 is caused to ride on the windshield surface and in turn applies a force to the section 14', causing the same to be slightly twisted to assure that the associated wiping head 24' properly follows the contour of the windshield surface. The contact element 34 may be formed from a nylon material or other equivalent materials which offer small frictional resistance to glass and do not scratch or mar the surface thereof.

FIGURE 9 illustrates the specific mechanism for mounting the windshield wiper assembly described hereinabove to the driving shaft of an associated driving motor. The mounting mechanism consists of the main body, generally indicated by reference numeral 40, one end portion of which is provided with a recess 42 for receiving the free end of a driving shaft 30 of a driving motor (not shown). The innermost end of the recess 42 is splined to mate with a cooperating spline portion at the free end of the shaft 30. The shaft 30 is further provided with a reduced diameter portion 31 to receive the end of a set screw 44 which is threadably engaged in a threaded aperture in the side wall of the body 40. The set screw 44 positively locks the mounting mechanism to the driving shaft 30 to prevent removal thereof without first backing off the set screw 44.

The main body 40 is further provided with an aperture 46 which extends substantially perpendicular to the recess 42. A fulcrum or ridge 48 is formed within the aperture 46 intermediate the ends thereof. A pair of spaced adjusting screws 50 and 52 are threadably engaged within suitable threaded apertures formed in the body 40 to communicate with the interior of the aperture 46 on the side thereof opposite the fulcrum 48. After the main body 40 is properly affixed to the driving shaft 30, the section 12 of the element 10 is inserted into the aperture 46 so that the notch 16 rests on the fulcrum 48. The set screws 50 and 52 are tightened to effect the desired angle of presentation and the pressure, respectively, of the curved tapered section 14 with reference to the associated windshield. It will be appreciated that a wide range of adjustments can be effected by the inter-relationship of the adjustments of the adjusting screws 50 and 52.

The inventive concept herein described may be associated with the conventional articulated arm currently used on automobiles and for that purpose the wiper unit would consist of a wiper which extends in opposite directions from its point of attachment with the oscillating arm and as such the spring element tapers in both directions from its center, thus involving double taper design.

A further modification resides in the incorporation of the wiping elastomer edge and the spring in the same molding of the same material, thereby producing an entirely monolithic unit employing advanced plastic technology. In this instance provision would be made for a steel insert at the 1A and 1B section or an attachment of the monolithic inboard from 1A to 1B to a steel spring member 1A to 1B, the taper form hereinbefore described being incorporated.

It will be understood that the above described structure provides a windshield wiper assembly wherein a single continuous spring element comprises the sole transducer of pressure and oscillation to the wiping element of the assembly and at the same time acts to distribute the pressure approximately equally over the entire wiping length while inherently compensating for vertical and compound curvature variations of the windshield surface without the necessity of employing relatively more complicated articulated constructions of the prior art. Further, the simple structure hereinabove described adequately acts upon a convex or concave surface with substantially equal efficiency.

In accordance with the provisions of the patent statutes, I have explained the principle and mode of operation of my invention and have illustrated and described what I now consider to represent its best embodiments. However, I desire to have it understood that within the scope of the appended claims, the invention may be practiced otherwise than as specifically illustrated and described.

What I claim is:

1. A windshield wiper device for curved windshields, comprising a one-piece continuous elongated strip-like element formed of a spring-like material, a major length of said element extending inwardly from the outer free end thereof being curved and constituting a windshield wiping section, the opposite end portion of said element constituting an attachment section formed for securement to a driving means and an intermediate section between and integral with said wiping section and attachment section, said intermediate section being bowed outwardly with respect to said wiping section and attachment section and flexible in a direction normal to the windshield to provide spring tension for urging said wiping section into engagement with the windshield, and a flexible resilient wiping medium carried by said wiping section and covering at least the surface of the said wiping section adjacent the windshield.

2. The invention defined in claim 1, in which said attachment section and intermediate section are of uniform and constant width and thickness while said wiping section is of the same width as said attachment section and intermediate section but which tapers in thickness from said intermediate section to the free end thereof, and in which said intermediate section is flexible in a direction normal to its width.

3. The invention defined in claim 2, in which said attachment section is longitudinally shaped to provide a notched configuration for securement to a driving means to provide for adjustment of the angle of presentation and degree of pressure of the wiping section with reference to the windshield.

References Cited

UNITED STATES PATENTS

| | | | |
|---|---|---|---|
| 2,814,821 | 12/1957 | Wallis | 15—250.37 |
| 3,192,551 | 7/1965 | Appel | 15—250.36 |
| 2,613,385 | 10/1952 | Wylie | 15—250.37 X |
| 2,981,967 | 5/1961 | Dudley | 15—250.37 |

FOREIGN PATENTS 1,217,680  12/1959  France.

CHARLES A. WILLMUTH, *Primary Examiner.*